(12) United States Patent
Chiou et al.

(10) Patent No.: US 11,886,648 B2
(45) Date of Patent: Jan. 30, 2024

(54) DETECTING KEYBOARD ACCESSIBILITY ISSUES IN WEB APPLICATIONS

(71) Applicant: University of Southern California, Los Angeles, CA (US)

(72) Inventors: Paul Chiou, Los Angeles, CA (US); Ali Alotaibi, Los Angeles, CA (US); William Halfond, Los Angeles, CA (US)

(73) Assignee: University Of Southern California, Los Angeles, CA (US)

(*) Notice: Subject to any disclaimer, the term of this patent is extended or adjusted under 35 U.S.C. 154(b) by 0 days.

(21) Appl. No.: 17/891,695

(22) Filed: Aug. 19, 2022

(65) Prior Publication Data

US 2023/0074584 A1   Mar. 9, 2023

Related U.S. Application Data

(60) Provisional application No. 63/235,559, filed on Aug. 20, 2021.

(51) Int. Cl.
*G06F 16/00* (2019.01)
*G06F 3/023* (2006.01)
*G06F 16/957* (2019.01)

(52) U.S. Cl.
CPC ........ *G06F 3/0238* (2013.01); *G06F 16/9577* (2019.01)

(58) Field of Classification Search
CPC .. G06F 3/0238; G06F 16/9577; G06F 3/0484; G06F 9/451; G09B 21/00
See application file for complete search history.

(56) References Cited

U.S. PATENT DOCUMENTS 6,249,812 B1 * 6/2001 Cromer ............... H04L 41/0681
714/26
2006/0139312 A1 * 6/2006 Sinclair, II ............ G06F 3/0481
345/156

* cited by examiner

*Primary Examiner* — Jared M Bibbee
(74) *Attorney, Agent, or Firm* — Nixon Peabody LLP

(57) ABSTRACT

A method for detecting and/or localizing keyboard accessibility failures (KAFs) in a web page is disclosed. A web page is rendered in a browser on a display portion of a computing system. A keyboard navigation flow graph based on based on keyboard-based navigation of a user with the web page. A second point-click navigation flow graph based on mouse-based navigation of the user with the web page. One or more KAFs are determined based on a comparison of the first graphical model with the second graphical model.

20 Claims, 13 Drawing Sheets

Algorithm 1 Inaccessible Functionality Detection

| | |
|---|---|
| Input: | *PCNFG*\*: Mouse navigation model |
| Input: | *KNFG*\*: Keyboard navigation model |
| Output: | True or False |

1: $V_{IF} \leftarrow \emptyset$, $V_{NA} \leftarrow \emptyset$,
2: $V_{PC} \leftarrow$ getReachableNodes($v_{user}$, *PCNFG*\*)
3: for $v_{pc} \in V_{PC}$ do
4:    $v_k \leftarrow$ *correspondingNodeInKNFG*($v_{pc}$, *KNFG*\*)
5:    if $\neg$ isReachable($v_0 \rightarrow v_k$, *KNFG*\*) then
6:       $V_{IF} \leftarrow V_{IF} \cup \{v_k\}$
7:    if $\neg \exists e \in outEdges(v_k) \land e.\delta == $ True then
8:       $V_{NA} \leftarrow V_{NA} \cup \{v_k\}$
9: return ($V_{IF} \cup V_{NA}$) $\neq \emptyset$

FIG. 4

Algorithm 2 Inaccessible Functionality Localization

Input: $PCNFG_*$: Mouse navigation model
Input: $KNFG_*$: Keyboard navigation model
Output: Ranked list of suspicious edges 1: $E \leftarrow \emptyset$
2: for each $PCNFG \in PCNFG_*$ do
3:     $KNFGState \leftarrow correspondingState(PCNFG)$
4:     if $KNFGState \in KNFG_*$ then ▷ /* Intra-state */
5:         $V_{PC} \leftarrow getReachableNodes(v_{user}, PCNFG)$
6:         $V_K \leftarrow correspondingNodesInKNFG(V_{PC})$
7:         $V_S \leftarrow getReachableNodes(v_0, KNFG)$
8:         $V_{KAF} \leftarrow V_K - V_S$
9:         for each $v_{kaf} \in V_{KAF}$ do
10:             $V_T \leftarrow backwardReachability(v_{kaf})$
11:             /* Assign suspiciousness scores for nodes in $V_S$ */
12:             for all $v_s \in V_S$ do $resetScore(v_s)$
13:             for all $v_t \in V_T$ do
14:                 for all $v_s \in V_S$ do $score(v_s)\mathrel{-}= distance(v_t, v_s)$
15:             /* Assign suspiciousness scores for nodes in $V_T$ */
16:             for all $v_t \in V_T$ do $Score(v_t) = -rank(v_t, V_T)$
17:             for each $(v_s, v_t) \in V_S \times V_T$ do
18:                 $score((v_s, v_t)) \leftarrow score(E.(v_s, v_t)) + score(v_s) + score(v_t)$
19:             $E \leftarrow E \cup addEdge((v_s, v_t))$
20:     else ▷ /* Inter-state */
21:         $e \leftarrow getStateTransitionEdge(PCNFG)$
22:         $E \leftarrow E \cup addEdge(e, 0)$
23: return edges in $E$ sorted by score of each edge

FIG. 5

Algorithm 3 Keyboard Trap Detection

| | |
|---|---|
| Input: | $KNFG*$: Keyboard navigation model |
| Output: | True or False |

1: for each $KNFG \in KNFG*$ do
2:     $KNFG_{TAB} \leftarrow$ getEdgeInducedSubgraph($KNFG$)
3:     $KNFG_{SHIFTTAB} \leftarrow$ getEdgeInducedSubgraph($KNFG$)
4:     for each $KNFG_{TAB}$ and $KNFG_{SHIFTTAB}$ as $G$ do
5:         $G$.removeEdges($v_n \leftrightarrow v_0$)
6:         if $G$ contains a cycle then return True
7: return False

FIG. 6

Algorithm 4 Keyboard Trap Localization

Input: $KNFG*$: Keyboard navigation model
Output: Ranked list of suspicious edges 1: $E \leftarrow \emptyset$
2: for each $KNFG \in KNFG*$ do
3:     $KNFG_{TAB} \leftarrow$ getEdgeInducedSubgraph($KNFG$)
4:     $KNFG_{SHIFTTAB} \leftarrow$ getEdgeInducedSubgraph($KNFG$)
5:     for each $KNFG_{TAB}$ and $KNFG_{SHIFTTAB}$ as $G$ do
6:         $G$.removeEdges($v_n \leftrightarrow v_0$)
7:         $E_{bridge} \leftarrow$ Tarjan($G$)
8:         $G$.removeEdges($E_{bridge}$)
9:         for all $v \in G$ where degree($v$) = 0 do $G$.removeNode($v$)
10:        for each $V_{comp} \in G$ do
11:            for edge $\in V_{comp}$ do
12:                $E \leftarrow E \cup edge$
13:                score($edge$)+= 1
14:            if $G$.instanceOf($KNGF_{TAB}$) then
15:                $e_{back} \leftarrow$ getEdge(min(rank($V_{comp}$)), max(rank($V_{comp}$)))
16:            else if $G$.instanceOf($KNGF_{SHIFTTAB}$) then
17:                $e_{back} \leftarrow$ getEdge(max(rank($V_{comp}$)), min(rank($V_{comp}$)))
18:            $E \leftarrow E \cup e_{back}$
19:            score($e_{back}$)+= 1
20: return edges in $E$ sorted by score of each edge

FIG. 7

| Tool | Inaccessible Functionality Failure | | | | Keyboard Trap Failure | | | | Run time (Minutes) Average |
|---|---|---|---|---|---|---|---|---|---|
| | DEP(%) | DER(%) | LOR(%) #MEF | #AEF | DEP(%) | DER(%) | LOR(%) #MEF | #AEF | |
| KAFE | 92 | 100 | 94 | 5 | 8.8 | 90 | 90 | 89 | 1 | 4 | 19.22 |
| aria-check | 60 | 100 | n/a | n/a | n/a | 0 | 0 | n/a | n/a | n/a | 0.03 |
| tabindex-counter | 93 | 39 | n/a | n/a | n/a | 0 | 0 | n/a | n/a | n/a | 0.03 |
| QualWeb | 83 | 27 | 6 | 6.9 | 12.4 | 0 | 0 | 0 | n/a | n/a | 2 |
| WAVE | 68 | 70 | 16 | 8.5 | 18.5 | 0 | 0 | 0 | n/a | n/a | 0.1 |

Table 1: Detection, localization, and timing results for each evaluated approach.

DETECTING KEYBOARD ACCESSIBILITY ISSUES IN WEB APPLICATIONS

PRIORITY CLAIM

This application claims the benefit of and priority to U.S. Provisional Application Ser. No. 63/235,559 filed on Aug. 20, 2021. The contents of that application are hereby incorporated by reference in their entirety.

STATEMENT REGARDING FEDERALLY SPONSORED RESEARCH OR DEVELOPMENT

This invention was made with government support under Grant No. 2009045 awarded by the National Science Foundation. The government has certain rights in the invention.

TECHNICAL FIELD

The present disclosure relates to web accessibility.

BACKGROUND AND SUMMARY

The following description includes information that may be useful in understanding the present invention. It is not an admission that any of the information provided herein is prior art or relevant to the presently claimed invention, or that any publication specifically or implicitly referenced is prior art.

The Web is fundamentally designed to work for "all people" yet, 15% of the world's population possesses some type of disability that can hinder their ability to use the Web. For them, access to web applications is particularly important as the Web provides connections to services and information that might otherwise be unavailable. Despite legislation that mandates companies to provide equally accessible websites, web accessibility issues are widespread. As of 2019, 70% of internet sites contained "accessibility blockers" that made critical functionality inaccessible to disabled users, resulting in considerable disadvantages for people with disabilities.

Users with disabilities are often unable to use a traditional point-and-click or touch-operated device and must use other mechanisms to interact with web applications. For example, users with disabilities may employ Assistive Technology (AT), such as screen readers, speech-based controllers, and switch devices. Since the keyboard is the most universally supported alternative input method operable by people with disabilities, most AT generate emulated keystrokes to navigate a web application's User Interface (UI). Unfortunately, keyboard accessibility is one of the most common and prevalent accessibility issues. Studies show that as many as 48% of popular websites lack keyboard accessible mechanisms and 4% contain accessibility bugs that make the keyboard completely unusable. The manifestation of these issues are referred to herein as Keyboard Accessibility Failures (KAFs), which include failures that prevent the user from interacting with the web app's UI features using the keyboard.

Testing for KAFs is challenging due to the highly complex nature of client-side UIs in modern web applications. These UIs provide responsive and dynamic interfaces that are highly mutable and contain content that can be dynamically created and binded with JavaScript. This poses several challenges: First, the static HTML source code may not resemble the Document Object Model (DOM) with which end-users actually interact, making traditional static analysis on HTML source code inadequate. Second, the keyboard interaction governed by the event-driven execution environment may be constantly changing as the web application enters different UI states. This makes it necessary to identify a web application's possible behaviors, beyond simply a one-time "snapshot." Finally, the JavaScript code responsible for event handlers and their interactions can be difficult to analyze using static analysis, which makes it difficult to statically model keyboard handling in a UI. Together, these challenges can make it very difficult to adequately test for keyboard accessibility issues.

There are several disadvantages with previous testing approaches for identification of KAFs. As one example, existing techniques for identifying keyboard inaccessibility issues have limitations in their usage and applicability. For example, Fona statically analyzes a web page's DOM content to identify KAFs. However, Fona only analyzes specific attributes of DOM elements and does not completely capture all the different ways KAFs can be introduced into a web page. Other approaches, such as Pyccuracy and aria-check allow developers to write or use scenario based tests to check keyboard accessibility requirements. However, these techniques require developers to employ manually generated test cases for each of their pages and anticipate the problems that may occur. As a result, keyboard accessibility testing largely remains a manual effort that requires visual inspections of a web page, which makes it a time consuming, costly, and error-prone process.

Further, Guideliner is a tool that assesses web UI element conformance to a predefined set of usability guidelines. It focuses on visual characteristics of web UIs, such as the position of elements on the screen, the distance between the elements, and the length of scrolling. VizAssert uses formal verification methods to attempt detection and repair on inaccessible layout properties. Both approaches focus on accessibility relating to layout properties and are not capable of interacting with the page under test (PUT) to expose KAFs.

AXERAY is an automated approach that infers semantic groupings of elements across various regions of a web page to test if these elements violate their WAI-ARIA roles' semantic structure. Research work verifies ARIA specifications on dynamic content and UI components to detect interactive accessibility issues. Although ARIA is useful in providing custom attributes via the browser's Accessibility API, it alone does not ensure these interactable control elements are properly scripted to be accessible. Past work evaluates various dynamic UI elements that can cause AT accessibility issues. They characterize complex custom widgets and navigation elements such as drop-down menus, tab widgets, menu popups, date picker, slideshows and Carousels widgets to ensure they behave according to accessibility standards. Although useful for inspiring best practices for implementing IAF conformance, these ad-hoc approaches cannot be generalized to handle keyboard on a more diverse scale.

Many techniques focus on mobile accessibility issues and their conformance measures based on violations, and particularly toward developed accessibility checkers to identify and categorize the identified issues. While the majority of this research is related to mobile accessibility failure detection, some research focuses on repairing these failures as well as other deep learning based repair. Latte is another technique that automatically executes use cases using assistive services to detect accessibility failures. However, these approaches only work on Android applications, not web based applications.

In order to at least partially address some of the above-mentioned disadvantages, the present disclosure is directed toward systems and methods for automatically detecting and localizing KAFs in web pages. In one example, a method for detecting and/or localizing KAFs comprises combining a static analysis model and a dynamic analysis model to address one or more complications caused by web application user interfaces and to identify one or more behaviors causing KAFs. In this way, both the complications caused by complex modern web app UIs and behaviors that can cause KAFs may be more efficiently, effectively, and thoroughly identified. In one example, a dynamic web crawling technique that systematically builds a navigational model representing the possible keyboard based navigation through a web page's UI elements, including those induced by JavaScript based behaviors is provided. Then, the navigational model is analyzed to identify when the present or missing navigation flows will lead to a KAF. Evaluation of the methods and systems described herein showed that the approach is highly accurate, in terms of precision and recall, in detecting KAFs and identifying the HTML code responsible for the observed failures.

In this way, the navigational model that is based on keyboard for a web page may be utilized for more accurately detecting KAFs and identifying the cause for the KAFs. Further, the methods and systems described herein provide the first formalization of keyboard accessibility issues in terms of graph-based properties. Furthermore, a fully automated detection and localization technique that outperforms state-of-the-art and practice on real-world web applications is provided. Further still, a study on a set of real-world web pages that shows that the methods and systems described herein are accurate and efficient.

In one embodiment, a method for detecting and/or localizing keyboard accessibility failures (KAFs) comprises: rendering a web page in a browser on a display portion of a computing system; generating, via a processor of the computing system, a first graphical model based on a first type of interaction of a user with the web page; generating, via the processor, a second graphical model based on a second type of interaction of the user with the web page; and detecting one or more KAFs based on a comparison of the first graphical model with the second graphical model.

In one example, the first graphical model is based on keyboard-based navigation and the second graphical model is based on mouse-based navigation. Further, the first graphical model includes a set of keyboard navigation flow graphs (KNFGs) and the second graphical model includes a set of point-click navigation flow graphs (PCNFGs).

In some examples, detecting the one or more KAFs based on the comparison of the first graphical model with the second graphical model includes detecting one or more of inaccessible functionalities and keyboard traps. The method may further comprise localizing the detected one or more KAFs.

In some examples, each KNFG includes one or more of a set of all nodes in the KNFG, a state of the web page, an entry node of the KNFG, and a set of keyboard based actions that cause a focus transition between nodes in the KNFG, and a set of edges representing a set of the transitions in the web page.

In some examples, each PCNFG includes a set of all nodes in the PCNFG, a state based on the set of nodes that are visible in the web page, an initial node, a set of mouse event types, and a set of edges that represent the mouse navigation control flow.

In some examples, the set of all nodes includes a node for each HTML in the web page.

In some examples, the state of the web page includes a set of HTML elements visible in the web page.

In some examples, the edges in the KNFG are identified by iteratively exploring the page using only keyboard based actions.

In some examples, the inaccessible functionalities are based on one or more missing edges from the KNFG and/or a missing key board handler for an element.

In some examples, localizing inaccessible functionalities includes finding the one or more missing edges, which includes for each missing edge, identifying the most likely source node of the missing edge and the second part tries to identify the most likely target node of the missing edge.

In some examples, finding the one or more missing edges includes analyzing the KNFG and its corresponding PCFNG, and generating a suspiciousness score for a plurality of edges.

In another embodiment, a method for detecting KAFs comprises: rendering a web page; modelling a keyboard based navigation of the web page based on user input from a keyboard; modelling a mouse based navigation of the web page based on user input from a mouse; detecting and/or localizing one or more KAFs based on the modelled key board based navigation and the modelled mouse based navigation.

In yet another embodiment, a system for detecting and/or localizing one or more KAFs is disclosed. The system includes a control system comprising one or more processors and at least one non-transitory memory; a keyboard; a mouse; and a display. The control system is configured to execute the machine executable code stored in non-transitory memory to cause the control system to: render a web page; generate a first keyboard based model based on navigation of the web page using the keyboard; generate a second point-click based model based on navigation of the web page using the mouse; and detect one or more keyboard accessibility failures based on the first keyboard based model and the second point-click based model.

In some examples, the control system is further configured to execute machine executable code to cause the control system to localize the detected keyboard accessibility failure.

In some examples, the keyboard based model includes one or more of a set of all nodes, each representing an HTML element, a state of the web page, an entry node, and a set of keyboard based actions that cause a focus transition between nodes, and a set of edges representing a set of the transitions in the web page.

In some examples, the point-click based model includes a set of all nodes, each representing an HTML element, a state based on the set of nodes that are visible in the web page, an initial node, a set of mouse event types, and a set of edges that represent the mouse navigation control flow.

In yet another embodiment, a non-transitory machine readable medium having stored thereon instructions for performing a method comprising machine executable code which when executed by at least one machine, causes the machine to: render a web page; model a keyboard based navigation of the web page based on user input from a keyboard; model a mouse based navigation of the web page based on user input from a mouse; and detect one or more KAFs based on the modelled key board based navigation and the modelled mouse based navigation.

BRIEF DESCRIPTION OF DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings:

FIG. 4 is an example inaccessible functionality detection algorithm, according to one or more embodiments of the present disclosure;

FIG. 5 is an example edge localization algorithm, according to one or more embodiments of the present disclosure;

FIG. 6 is an example keyboard trap detection algorithm, according to one or more embodiments of the present disclosure;

FIG. 7 is an example keyboard trap localization algorithm, according to one or more embodiments of the present disclosure;

FIG. 8 is a table of the results from testing the example process, according to one or more embodiments of the present disclosure;

FIG. 9A shows an example of a keyboard accessibility failure on a web page, according to one or more embodiments of the present disclosure;

DETAILED DESCRIPTION

Figure 1A:
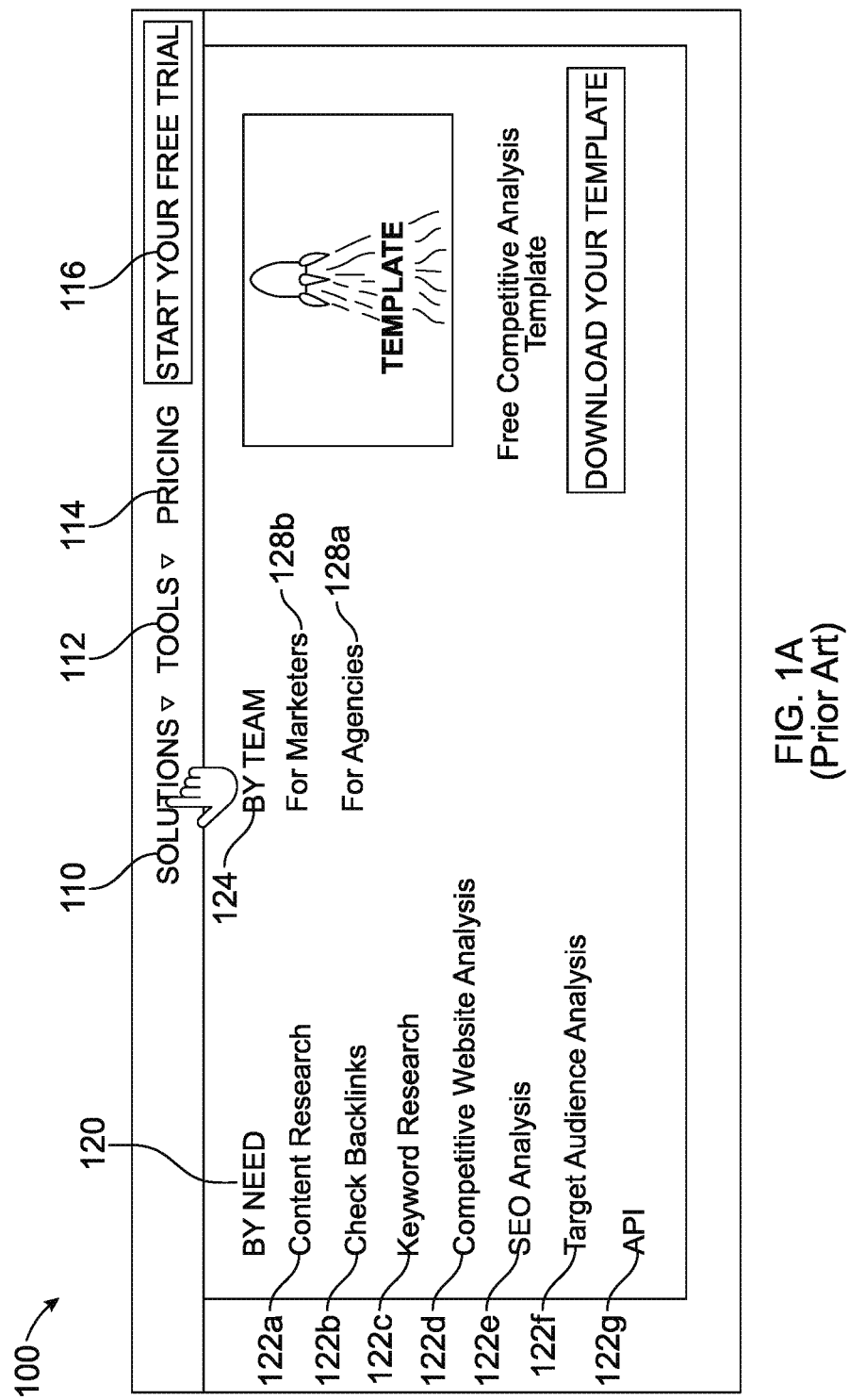
FIG. 1A shows an example prior art web page user interface including one or more Keyboard Accessibility Failures (KAFs)

Unless defined otherwise, technical and scientific terms used herein have the same meaning as commonly understood by one of ordinary skill in the art to which this invention belongs. One skilled in the art will recognize many methods and materials similar or equivalent to those described herein, which could be used in the practice of the present invention. Indeed, the present invention is in no way limited to the methods and materials specifically described. For example, the Figures primarily illustrate the present invention in the gastrointestinal tract, but as indicated throughout, the disclosed systems and methods can be used for other applications.

In some embodiments, properties such as dimensions, shapes, relative positions, and so forth, used to describe and claim certain embodiments of the invention are to be understood as being modified by the term "about."

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The keyboard is the most universally supported input method operable by people with disabilities. Yet, many popular websites lack keyboard accessible mechanism, which could cause failures that make the website unusable. The present disclosure is directed toward a method and system for automatically detecting and localizing keyboard accessibility failures in web applications. Evaluation of the example process on real world web pages demonstrates that the example process detects keyboard failures in web applications with high precision and recall and was able to accurately identify the underlying elements in the web pages that led to the observed problems.

Keyboard usage is one of the foundational requirements for web accessibility and it is reflected in Guideline 2.1 of the W3C Web Accessibility Initiative (WAI)'s Web Content Accessibility Guideline (WCAG) 2.1. These guidelines require web UIs to be usable by the many users that operate the computer solely with a keyboard-based input device. Keyboard-based users utilize a set of standard keyboard commands to navigate to different items of interest in web applications and carry out a desired action.

Point-and-click based users and keyboard based users interact with a web page's UI elements in a very different manner. In the point-and-click (PNC) modality, users move a cursor using a pointing device (e.g., mouse) and press buttons to activate a UI element underneath the cursor. In the keyboard modality, users must press keyboard buttons, such as "Tab" and "Shift" plus "Tab", to move the browser's focus to a UI element that the user wants to interact with. Unlike the PNC modality, moving between UI elements with a keyboard happens sequentially; meaning that if a user is currently on element n and wants to interact with element n+i, then the user must press the "Tab" key i times until focus is on the desired element. The user may also press "Shift" key and "Tab" key simultaneously to move backwards through the elements. The ordering of the elements is determined by the browser based on the structure of the DOM, but may be overridden by a developer using JavaScript or HTML attributes, such as tabindex. Herein, the ordering of the elements in this sequence is termed the keyboard navigation flow of the web page's UI. Once an element has focus, a keyboard user can carry out actions on it by pressing other keyboard buttons. For example, when the focus is moved onto a group of elements, such as menu lists or radio-buttons, the arrow keys ↑ ↓ ← → can be used to move between the elements of the group. The "Space" or "Enter" keys are used to manipulate the element currently in focus and the "Esc" key is typically used to exit a user prompt or dialog. All web browsers are required by the W3C's User Agent Accessibility Guidelines to support this standard set of keyboard strokes through their keyboard API.

Although Keyboard Accessibility Failures (KAFs) can refer to a wide range of keyboard related accessibility issues. Herein, the term Keyboard Accessibility Failures (KAFs) in this disclosure to specifically refer to two common types of KAFs that impact the keyboard navigation flow of a web page's UI. These are: (1) Inaccessible Functionalities (IAFs) and (2) Keyboard Traps (KTFs), which are formally defined under WCAG Success Criteria (SC) sections 2.1.1 and 2.1.2.

Inaccessible Functionalities

SC 2.1.1 requires all functionality of a web page to be available via the keyboard interface. The term Inaccessible Functionality (IAF) is used to describe failures of a web page UI to conform with this guideline. This type of KAF occurs when an interactive element is not included in the keyboard navigation flow of the UI or an element in the navigation flow does not have a keyboard event handler. This means that a keyboard based user is either unable to use the standard keyboard navigation keys to put focus on one or more elements in the page's UI or that the element is not actionable and the user is unable to activate the UI element's functionality. There are many root causes of this type of failure, which we discuss in depth below, but most relate to custom control elements that do not have event handlers properly defined.

An example of inaccessible functionality occurs in the header navigation menu of an example web page for search engine optimization (SEO) services. A screen image 100 of the website is shown in FIG. 1A. The website in the screen image 100 includes a solutions menu item 110, a tools menu item 112, a pricing menu item 114, and a promotion (start your own free trial) item 116. A by need area 120 includes a series of different links 122*a*, 122*b*, 122*c*, 122*d*, 122*e*, 122*f* and 122*g*. A by team area 124 includes a marketers link 126*a* and a for agencies link 126*b*. A download template link 130 is provided for a competitive analysis template. In the website 100, the "solutions" menu item 110 and the "tools" menu item 112 expand respective sub-menu items when the mouse cursor is hovered over them. These menu items are implemented with <div> elements that have the :hover CSS pseudo-class defined in the web page's static CSS declarations to make them interactable. Since the expansion of the sub-menus are only triggered with mouse hover, the contained links 122*a*-122*g*, 128*a*-128*b*, and 130 are not accessible to keyboard-based users, resulting in a situation where none of the sub-menu items 122*a*-122*g*, 128*a*-128*b*, and 130 can be seen by a keyboard based user.

Keyboard Traps

SC 2.1.2 requires that if keyboard focus can be moved to a UI element of the page using the keyboard interface, then focus must also be able to move away from that element using only the keyboard interface. The term Keyboard Trap (KTF) is used to describe failures of a web page UI to conform with this guideline. This type of KAF occurs when focus becomes "stuck" on a sequence of one or more interactive elements and the user is unable to interact further with other parts of the web page via the keyboard. As with the first type of KAF, there are many possible root causes for this kind of KAF, which we discuss in depth in Section below, but the most common is the use of third-party widget plugins that once receiving focus, prevented the user from returning to content outside of the plug-in via the keyboard.

Figure 1B:
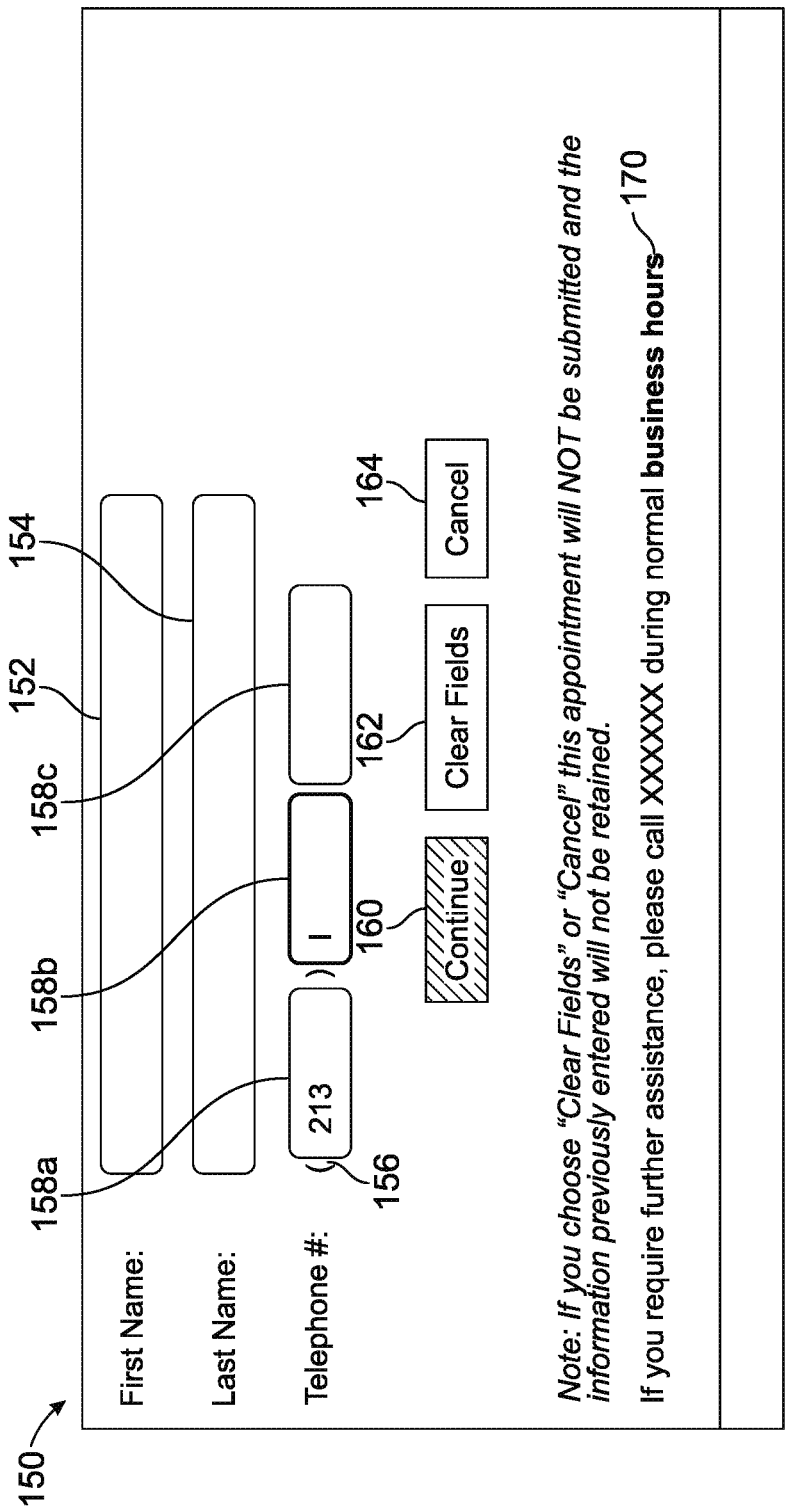
FIG. 1B shows another example prior art web page user interface including one or more KAFs.

FIG. 1B a screen image 150 of an example of another keyboard accessibility failure (KTF) in an example registration web page. The example registration page 150 is an organization's appointment registration page. The web page shown in the 150 includes a series of fill in fields including a first name field 152, a last name field 154, and a telephone field 156. The telephone field 156 has three input fields, an area code input field 158*a*, and two other input fields 158*b* and 158*c*. Three control buttons are provided such as a continue button 160, a clear fields button 162, and a cancel button 164. Various instructions 170 are shown.

In this example, a user has filled in the area code input field 158*a* and thus is advanced to the next input field 158*b*. A trap occurs because a user may not return to the code input field 158*a* from the input field 158*b*. A trap may also occur because a user may not return to the code input field 158*b* from the input field 158*c*. These traps are caused by JavaScript that auto advanced the keyboard cursor when the user typed part of a phone number. When three numbers were entered into an area code input field 158*a*, developer-defined JavaScript code automatically advanced the cursor to put focus on a next input field 158*b*. Consequently, a keyboard user is not able to make a correction to the area code by moving backwards, since on each attempt to shift focus to the area code input box would cause the JavaScript to again advance focus to the next input field 158*b*. In fact, any interactive element prior to the trap such as the first name field 152, the last name field 154 or the area code filed 158*a* is no longer accessible to the keyboard user after entering an area code.

Web Application Modeling

To perform the detection and localization of KAFs on a web page, the example process first builds models of the ways users can interact via keyboard and point-and-click with a Page Under Test (PUT). The first model is a Keyboard Navigation Flow Graph (KNFG), which models the different ways a keyboard user can interact with a page under test. The second model is a Point-Click Navigation Flow Graph (PCNFG), which represents the ways a point-and-click user can interact with a web page's UI and is similar to existing representations, such as the state flow graph. The graph-based approach allows generalization of the problem domain across different web application.

Modeling Keyboard Navigation Flow

To model keyboard navigation flow of a web page, a Keyboard Navigation Flow Graph (KNFG) is defined. A keyboard navigation flow of a page under test is represented by a set of KNFGs. Each KNFG represents the ways a web page's UI can be navigated from the perspective of a keyboard (KB) user. Formally, a KNFG is represented as a tuple (V, $V_s$, $v_0$, $\Phi_K$, E), where V is the set of all nodes in the graph and each $v \in V$ corresponds to a unique HTML element in the page under test, $V_s \subseteq V$ represents a state of the page under test, which is defined as the set of HTML elements that are visible in the page under test, $v_0 \in V$ is the entry node of the graph (i.e., the first HTML element that keyboard-based users can interact with when the page under test renders in the browser); $\Phi_K$ is the set of standard keyboard-based actions that may cause a focus transition between nodes in the graph; and E is the set of directed edges that represent the transitions that can occur in the page under test.

The node set of a KNFG, comprises a node for each HTML element in the page under test. The example process identifies the nodes by rendering the page under test in a browser and then analyzing the DOM of the page under test to identify each unique HTML element. Each node is uniquely identified by its XPath in the DOM. Syntactically linked nodes such as a <label> and its bounded form element and elements wrapped within other inline control elements are grouped, since these nodes are intended to represent a single functionality. A node $v_0 \in V$ represents the entry node of the graph and is the HTML element in the page that is the starting point for keyboard based navigation of the page. An initial 0 node of a page under test can be identified by determining the XPath of the element that initially has focus after the page renders in the browser.

The inclusion of state ($V_s$) in the KNFG enables modeling modern web applications where new HTML elements may be enabled or added to a page under test. $V_s$ is defined as the subset of all nodes in the page under test that are visible in the browser. This definition is well-suited for this problem domain, since only visible elements can be interacted with via the keyboard and any change in the set of visible elements may introduce a new navigation flow.

Figure 2A:
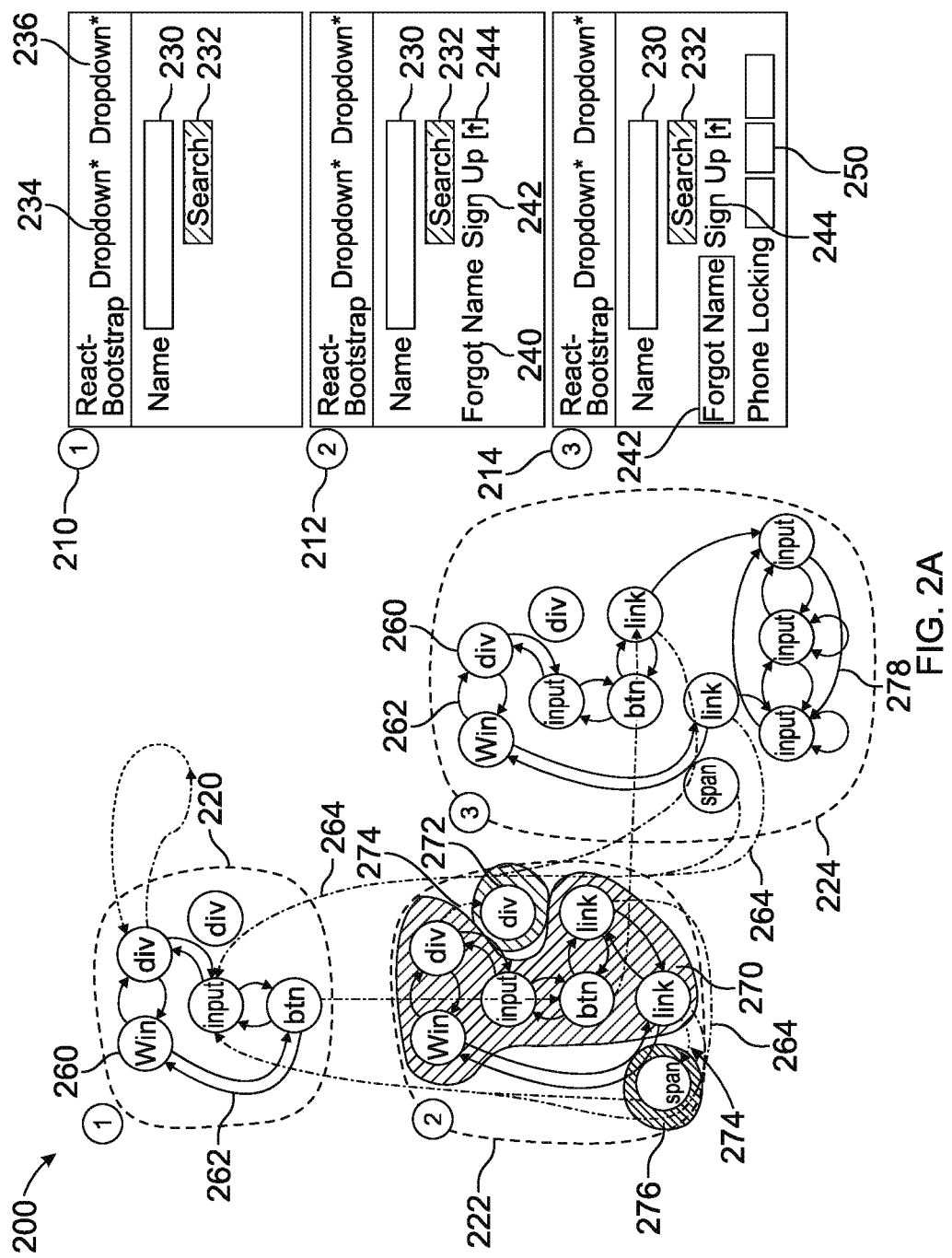
FIG. 2A shows an example keyboard navigation flow graph (KNFG) of a web page, according to one or more embodiments of the present disclosure.

An example of the example process may be shown in relation to an example page under test web page shown as different images 210, 212, and 214 that may be displayed from user navigation via keyboard in a keyboard navigation flow graph 200 as shown in FIG. 2A. The page under test is also shown in a point-click navigation flow graph 202 in FIG. 2B that includes two other images 216 and 218 that may be displayed via point-click navigation of the web page. Each of the images 210, 212, 214, 216, and 218 in FIGS. 2A-2B have a corresponding state map 220, 222, 224, 226, and 228 that determine the logic for navigating and displaying different fields and links in each of the different images 210, 212, 214, 216, and 218.

Figure 2B:
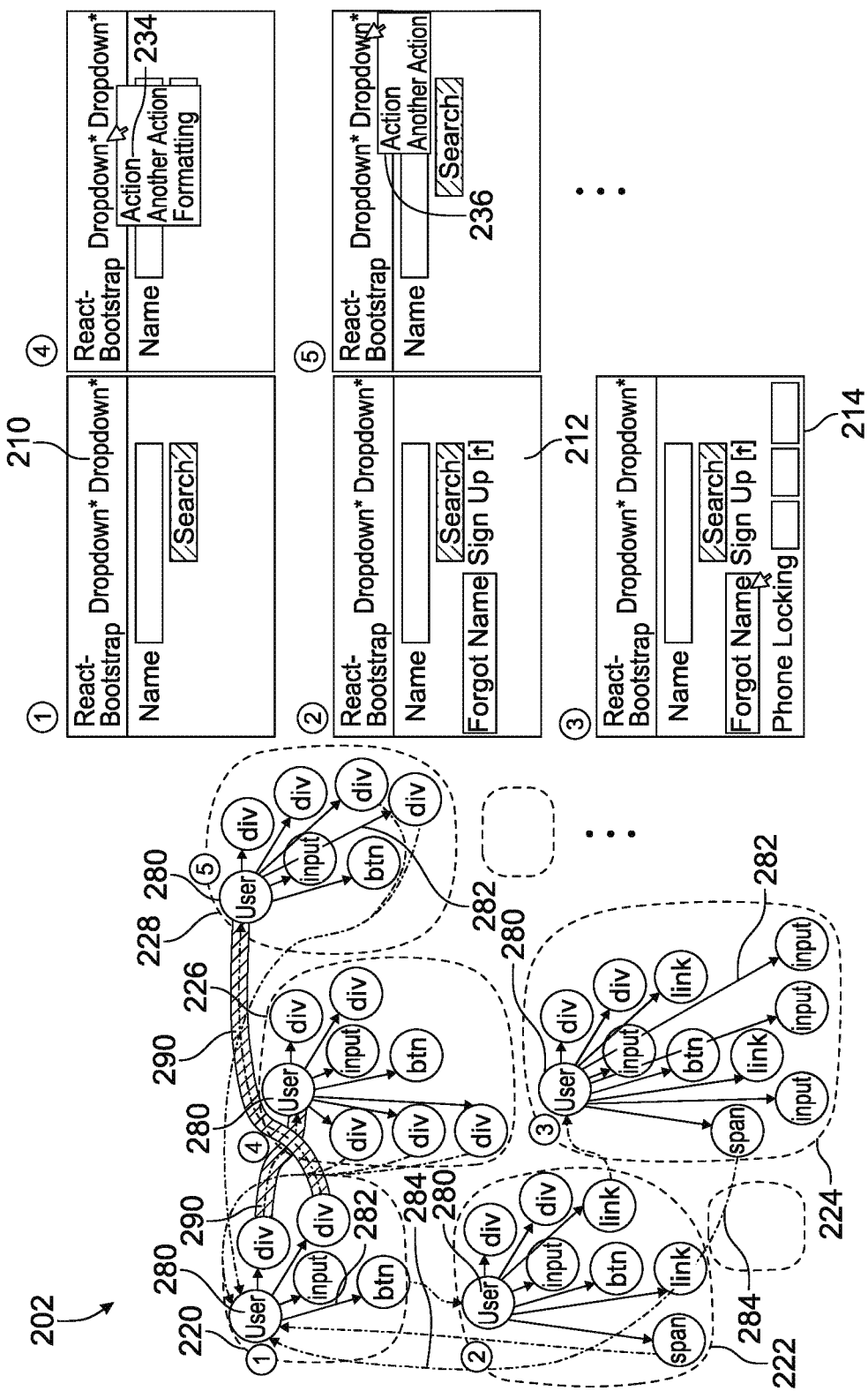
FIG. 2B shows an example point-click navigation flow graph (PCNFG) of the web page, according to one or more embodiments of the present disclosure.

The web page displays the first image 210 that includes a name input field 230 and a search button 232. Two menu dropdowns 234 and 236 may be activated in two other states 226 and 228 as shown in FIG. 2B in images 216 and 218. Links such as a forgot name link 240, a sign up link 242 and a close link 244 may be shown based on different buttons being activated. A phone number entry field 250 may also be shown based on activating the forgot name link 240. The close link 244 closes the forgot name link 240, sign up link 242, and phone entry field 250 and thus returns to the first image 210.

The keyboard navigation flow graph 200 in FIG. 2A shows the example web page broken into the three states 220, 222, and 224 that reflect the keyboard inputs. Each of the states, such as the state 220 includes a series of nodes 260 that represent HTML elements such as <Win>, <div>, <input>, <btn>, and <span>. Each of the nodes 260 represents an interactive element in the UI, denoted by the type of the element. For example, the two <div> nodes correspond to the dropdown menu elements 234 and 236, which are implemented using <div> type elements. Likewise, the <input> node corresponds to the name text input, and the <btn> element corresponds to the search button. The <Win> node is a special node that is not an actual element in the UI. Instead, it represents the browser window in which the user can TAB through to circle back to the beginning of the web page (from TAB the end of the page) and vice versa. Navigation between nodes 260 within a state may be joined by intra-state edges represented by lines 262. Inter-state edges are transitions between states and may be shown through lines 264. Each of the edges represents a keyboard entry such as Tab that may allow movement between nodes.

The point-click navigation flow graph 202 in FIG. 2B shows the example web page broken into the five states 220, 222, 224, 226 and 228 that represent point and click navigation. Each of the states, such as the state 220 includes a series of nodes 280 that represent HTML elements such as <Win>, <div>, <input>, <btn>, and <span>. As will be explained, the point-click navigation flow graph 202 in FIG. 2B also includes special input node representing an entry node. Navigation between nodes 280 within a state may be joined by intra-state edges represented by lines 282. The lines 282 represent that the focus can be programmatically put onto any element via point-and-click devices such as the mouse. Inter-state edges are transitions between states and may be shown through lines 284. Each of the edges represents a keyboard entry such as Tab that may move between nodes.

To illustrate the example process, in FIG. 2A, a hidden <div> component is the phone look up entry fields 250 in the image 214 that is not displayed until the user tabs to the "Forgot Name" link 240. The focus event triggers and expands the hidden <div>, displaying the encompassed three "Phone Lookup" text fields 250. The example process considers the images 210, 212, and 214 to be distinct states 220, 222, and 224, since the additional displayed links in the images 212 and 214 will define a new navigation flow through the page under test. Identifying the HTML elements that comprise $V_s$ is challenging because due to the complex interactions between HTML and CSS attributes, there is no canonical way to determine if a given node 260 is visible. Therefore, a set of heuristics are complied that the example process uses to determine if an element is visible. These are three types of elements. First, non-disabled elements that do not exhibit a final computed DOM layout style of type="hidden", visibility:hidden, display:none, or inherit their ancestor's rendered hidden properties. Second, elements that are not rendered with a height or width of zero pixels. Third, elements that are excluded from the visual flow of the page under test (e.g., elements inside another tab-menu, or inside containers that are collapsed whose contents aren't shown). All of these heuristics can be identified by analyzing the attributes of the elements in the DOM of the page under test when it has been rendered in the browser.

A keyboard user can manipulate interactive elements of a web page using a standard set of actions, which are represented by $\Phi_K$. This set of actions includes all standard keyboard commands used to navigate a web application's user interface as defined by W3C and web accessibility testing communities. Keyboard action, Φ's operations, can be broken into four categories: navigation (Tab, Shift+Tab,), selection (↑, ↓, ←, →), actuation (Enter, Space) and dismissal (Esc). The example process does not model keyboard shortcuts or scrolling keys such as PgUp, PgDn, Home, and End since they only change how contents are displayed (or move the keyboard cursor within a text input-based control) and serve no interactive purposes. To trigger navigation behaviors that require text input, two actions are included that represents the entry of text. The first is Σ and represents the entry of a random length string of alphanumeric characters. The second is $Σ_M$ and represents the entry of a maximum length string into the text input, where maximum length is determined by the maxlength attribute of the text input, if defined. Both text entry actions are followed by the Tab, Shift+Tab, or no action. This simulates the common user behavior of entering input or interacting with a control, and then moving to either the next or prior element in a page. In the text, these sequences are denoted by showing both relevant symbols as the action, even though they can be represented as a single compound action (e.g., entering max length text and then pressing tab would be represented as $Σ_M$ Tab). At a high level, the intra-state edges 262 in the example keyboard navigation flow graph 200 in FIG. 2A are identified by iteratively exploring the page using only keyboard based actions (i.e., $Φ_K$) until no new navigation information is found (i.e., the graph has reached a fixed point). The first iteration of this process begins by interacting with each node $υ∈V_s$. For a given υ, the process first sets the browser's focus on and then executes every action in $Φ_K$ on υ. After each action, the process analyzes the page to determine the focus transition that occurred. If an action causes a new state to be created, then the new state is added to a worklist of states that will be explored in subsequent iterations of the edge building process. If the action causes the page to attempt to navigate to a different page, the process intercepts this event and prevents it from happening. The process also includes two edges that link the last element in a page's tab order to the first (i.e., $υ_n→υ_0$ and $υ_n←υ_0$). This is done in order to exclude browser controls, which are accessible via Tab, from the KNFG. An edge can be either an intra-state or inter-state edge. The details of handling each kind of edge are described below.

Intra-state edges describe the navigation flow in a page as a result of an action on a node when there is no new page state created. After triggering an action $φ∈Φ_K$ on a node $υ_i$, the process detects the focus change from $υ_i$ to $υ_{i+1}$ and creates an edge in the graph $(υ_i, υ_{i+1}, φ, δ, V_s)$, indicating that the browser focus could shift from a source node $υ_i$ to a target node $υ_{i+1}$ by pressing keystroke φ while $υ_i$ is in focus. The process detects a change in focus by querying the browser to identify the element currently receiving focus in the page under test. If an action does not trigger a focus-shift (e.g., executing Space to tick a checkbox), a self edge is created. The edge creation mechanism can capture a shift (or no shift) in focus that is caused by JavaScript event handlers since it simply observes the response of the page to the keyboard action, which would include any JavaScript actions. Lastly, if φ causes any sort of change in the DOM's attributes' values, then the δ flag is set to True, otherwise it is set to False. For example, in FIG. 2A, an intra-state edge 262 exists between the "Name" input-field 230 to the "Search" button 232 since focus can transition between the two elements by pressing the Tab and no new visible HTML elements appear (i.e., there is no new state created). This intra-state edge and other intra-state edges 262 for this example are shown in a bold border around the name input field 230 in the images 212 and 214 in FIG. 2A.

Inter-state edges describe the navigation flow in a page when an action on a node leads to the creation of a new UI state. When the example process detects a new state, it creates an edge in the same way that an intra-state edge would be created with the exception of the target node. In this scenario, the target node is in the new state ($V'_s$) and is the node $υ_0∈V'_s$ to which focus is transferred to by the browser. An example of an inter-state edge 264 can be seen in FIG. 2A where pressing Esc on the "Forgot Name" link 240 and "Sign Up" link 242 in the image 212 (when the <div> component containing these links is active) will dismiss the <div> component and return the navigation to the state 220 representing the image 210. This edge and other inter-state edges are represented as edges 264 in FIGS. 2A-2B.

The KNFG construction is sound under the assumption that the keyboard navigation is deterministic (i.e., executing φ on every node would always transition the focus to the same node and a node has exactly one predecessor/successor through an intra-state edge). In some examples, where non-determinism may occur (an element could transition to different elements), such cases are always accompanied by some kind of visual state change, which would be captured in the KNFG building process. The edge construction is complete because it simulates all of the W3C default set of standardized keyboard navigation keys on each node. Further, the example process described herein could be applied to handle other key set, for example, if a web page were to use non-standard keys for interaction. The node identification is complete, since all nodes in a page can be identified by examining the DOM of the page at runtime.

Modeling Point and Click Navigation

The navigation and interactions available to a PNC user in a page under test are represented by a set of point-click navigation flow graphs (PCNFGs) such as the point-click navigation flow graph 202 in FIG. 2B. Each PCNFG represents the ways a web page user interface can be interacted with from the perspective of a PNC user for a particular state of the user interface of the page under test. Formally, a PCNFG is represented as a tuple $⟨V, V_s, υ_{user}, Φ_M, E⟩$, where V is the set of all nodes in the graph, $V_s⊆V$ represents the state, which is defined by the set of nodes that are visible in the page under test, $υ_{user}∈V$ is the initial node; $Φ_M$ is the set of mouse event types; and E is the set of edges that represent the mouse navigation control flow.

Information about the nodes in the PCNFG is defined similar to that of the KNFG. Specifically, the node set (V) and state ($V_s$) of the PCNFG are defined and identified in the same way as those for the KNFG. The one exception to this is the definition of the entry node $υ_{user}$ of the graph. Unlike the case of keyboard-based navigation, there is not a single node in the page under test that represents the starting point for PNC based navigation. Therefore, a special node $υ_{user}$ is defined that conceptually represents the entry to the page under test and connects to all of the nodes that a PNC user can interact with in the page under test.

A PNC based user can manipulate a page's interactive elements using a set of actions, which are represented by $Φ_M$. This set includes all mouse event types that implement the MouseEvent interface, such as mousedown, mouseup, click, mouseover, mouseenter, mouseleave, or mouseout. The edges 282 and 284 in the PCNFG are defined using a standard iterative crawling exploration similar to the construction of the state flow graph proposed by Crawljax. In the example process, the target elements that will have events triggered on them are represented by $V_s$ and the events to be triggered on them are represented by $\Phi_M$.

Detection and Localization of KAFS

Figure 3:
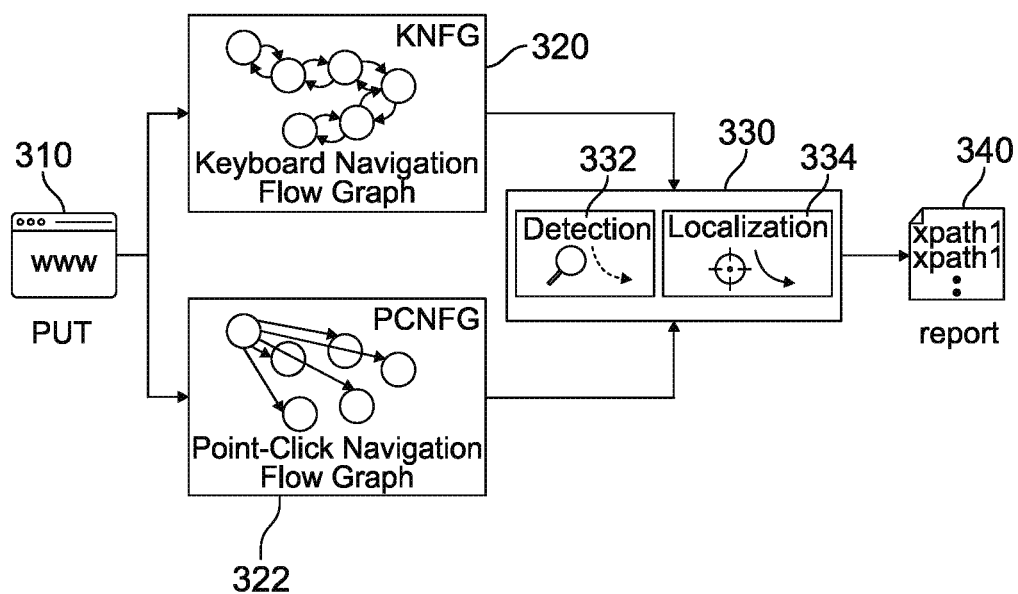
FIG. 3 shows a block diagram illustrating an overview of an example method for detecting and localizing keyboard accessibility failures, according to one or more embodiments of the present disclosure.

The example process detects and localizes Inaccessible Functionalities and Keyboard Traps by analyzing and comparing the KNFGs and PCNFGs generated for the page under test. FIG. 3 shows the workflow of the example process. A web page 310 that rendered in a browser on a display portion of a computing system is input for analysis. The web page 310 is parsed by a keyboard navigation flow graph generator 320 and a point-click navigation flow graph generator 322. The keyboard navigation flow graph generator 320 generates keyboard navigation flow graphs such as that shown in FIG. 2A, while the point-click navigation flow graph generator 322 generates point-click navigation flow graphs such as that shown in FIG. 2B. The resulting analysis process 330 includes a detection process 332 and a localization process 334. The detection process 332 detects different inaccessible functionalities and keyboard traps. The localization process 334 localizes the inaccessible functionalities and the keyboard traps. The result of the example process is a list of faults 340 that causes these inaccessible functionalities and keyboard traps as well as the locations of the inaccessible functionalities and keyboard traps. A revised web page may then be generated by creating and inserting remedies for the list of faults in the code for the web page. The revised web page thus eliminates the KAFs and may be accessed by keyboard users in a more efficient manner.

Detection of Inaccessible Functionalities

An inaccessible functionality occurs when functionality available to a point-and-click (PNC) user is not available to a keyboard (KB) user. At a high level, the example process in FIG. 3 identifies all of the interactive HTML elements available to a PNC user by analyzing the PCNFGs produced by the generator 322 and then, by analyzing the KNFGs produced by the generator 320, checks that the same elements can be navigated to and activated by a KB user.

FIG. 4 shows the algorithm for inaccessible functionality detection that detects Inaccessible Functionalities (IAFs). The inputs to the inaccessible functionality detection algorithm in FIG. 4 are the set of point-click navigation flow graphs and keyboard navigation flow graphs that were previously constructed from the generators 320 and 322 in FIG. 3. These sets of graphs are denoted as PCNFG* and KNFG*, respectively. First, the algorithm in FIG. 4 identifies the functionality (i.e., interactive elements) available to a PNC based user (line 2). This is done by calculating $V_{PC}$ the set of nodes in the PCNFG* that are reachable from $v_{user}$ (i.e., the entry node) of the initial state of the PCNFG*. Next the approach iterates over each node $v_{pc} \in V_{PC}$ and checks if it is also accessible to a KB user (lines 3-8). For each $v_{pc}$, the approach finds the corresponding node $v_k$ in the KNFG* (line 4). For a given state, both the PCNFG and KNFG have the same V set, and therefore there will always be a corresponding node if the corresponding KNFG state exists. The first accessibility check (line 5) determines if $v_k$ is reachable from $v_0$ of the KNFG*. If it is not, then this implies a KB user cannot navigate to $v_k$ using the keyboard navigation flow defined by the PUT and $v_k$ is considered to be inaccessible and added to $V_{IF}$, the set of elements inaccessible due to flow problems (line 6). The second accessibility check (line 7) determines if $v_k$ is actionable. A naive way to detect this would be to simply examine the DOM and determine if $v_k$ has either an explicit or implicit keyboard event handler associated with it. However, a keyboard event handler may be assigned through complex event delegation, which may not be visible via DOM inspection, or $v_k$ may handle some key presses (e.g., Tab and Shift+Tab) that simply change the browser focus without actually activating the element. Therefore, to determine if $v_k$ is actionable it is necessary to check in the KNFG whether it has any outgoing edges that modify the DOM state (i.e., δ is set to True). The presence of such an edge indicates that there exists some keyboard action on the element that can be triggered and do something other than transfer focus to another element. WCAG only requires actionable as an accessibility criteria when the element can be triggered by the mouse. This is accounted for in the example process since $v_k$ is the corresponding node of a node already in the PCNFG, and, by definition, a node is only in the PCNFG if it has an associated mouse event handler. Once all nodes in $V_{PC}$ have been analyzed, the detection returns a True/False based on whether any nodes have been identified as inaccessible (line 9). This algorithm can be optimized for page-level detection by returning True the first time any inaccessible element is identified (i.e., at lines 6 and 8).

In the keyboard navigation flow graph 202 from the example in FIG. 2A, the algorithm in FIG. 4 identifies that in state 220, $v_{dropdown2}$ must be accessible via the keyboard because it is reachable in the flow graph 202. However, in the keyboard navigation flow graph 202, it is unreachable from $v_0$ via intra-state flow edges 262, thus putting this node in $V_{IF}$. Similarly for $v_{dropdown1}$, the detection finds it is reachable from $v_0$ but finds there is no outgoing edge with δ=True. Such an edge would exist if its enter edge could have explored state 226 in FIG. 2B. Therefore this node is put into $V_{NA}$.

Localization of Inaccessible Functionalities

When inaccessible functionalities occur, it implies that there is either: (a) an edge missing from the KNFG that would connect the accessible components to the inaccessible components; or (b) an element is missing a required keyboard handler. The localization of elements identified under condition (b) is exactly the set of elements identified as $V_{NA}$ in the inaccessibility detection Algorithm in FIG. 4 and no further localization is needed for those elements. Therefore, the goal of the localization approach for IAFs is to find the missing edges. To do this, the example process analyzes the PCNFG* and KNFG* and assigns a suspiciousness score to various edges that could represent the most likely connection point. At a high-level, the intuition of the example process is to split the localization into two parts. The first part tries to identify the most likely source node of the missing edge and the second part tries to identify the most likely target node of the missing edge. The example process computes suspiciousness scores for each of these two node sets and then presents a ranking of the edges based on the combined suspiciousness of the source and target nodes of the edge. The algorithm for computing suspiciousness of each edge is shown in FIG. 5. The inputs to the edge localization algorithm in FIG. 5 are PCNFG* and KNFG*, as defined above.

The edge localization algorithm in FIG. 5 iterates over each state's PCNFG and checks to see if the state of the PCNFG exists in the KNFG*. Since both types of graphs have the same V set and define their states in the same manner, this check only needs to determine if the $V_S$ for the PCNFG* exists in the KNFG*.

If the state is present in the KNFG*, the approach examines the state to determine if it comprises nodes that are inaccessible to a KB based user. Lines 5-8 of the edge localization algorithm in FIG. 5 compute the set of nodes that are inaccessible for the keyboard user ($V_{KAF}$), using a process similar to that defined in the detection Algorithm in FIG. 4. The example process then iterates over each node $\upsilon_{kaf} \in V_{KAF}$ in order to determine the most likely source and target nodes for the missing edge that caused $\upsilon_{kaf}$. The possible source nodes are represented as $V_S$, which was already computed as the set of nodes reachable in the KNFG from $\upsilon_0$ at line 7 in FIG. 5. Since these nodes are reachable from the entry point, one of them will be the node that represents the source node of the missing edge. Conversely, $V_T$ represents the set of possible missing edge target nodes. The example process computes $V_T$ by finding all of the nodes that can reach to $\upsilon_{kaf}$. It may be assumed that the missing edge target node would always be $\upsilon_{kaf}$, however it is possible that $\upsilon_{kaf}$ may be part of a larger component, which is also inaccessible. In this scenario, these other nodes should also be considered as possible targets. For nodes in $V_T$, line 16 in FIG. 5 computes their suspiciousness score. The intuition of this score is that nodes in $V_T$ represent a subgraph of the KNFG and nodes higher in the topological ordering of this subgraph are most likely the correct target node, since they can themselves connect to the most nodes in the subgraph. Therefore, the algorithm in FIG. 5 rank assigns these nodes a higher suspiciousness. Specifically, the DOM based rank of each of the nodes in $V_T$ is used to assign suspiciousness. A suspiciousness score is also computed for nodes in $V_S$. In lines 13-14 of FIG. 5, the algorithm iterates over each of the nodes in $V_S$ and assigns a suspiciousness score to each of the nodes. The basic idea is that nodes in $V_S$ are considered more likely to be the source node if they are spatially "close" to nodes in $V_T$. "Close" is defined as the DOM tree based distance between the two nodes, which is calculated by the number of edges that must be traversed in the DOM tree for one node to reach another. This definition of closeness represents the design practice that keyboard navigation generally transitions between nodes that have some kind of locality. The approach then takes the Cartesian product of $V_S$ and $V_T$ and assigns the suspiciousness score of the edge ($\upsilon_s$, $\upsilon_t$) based on the sum of the suspiciousness scores of $\upsilon_s$ and $\upsilon_t$. The approach resets the node scores for $V_S$ and $V_T$ every time it processes a $\upsilon_{kaf}$ so the scores always reflect the suspiciousness with respect to the inaccessible components. The final scores of the edges in E are cumulative across all states (lines 18-19 in FIG. 5).

In the example in FIG. 2A, the localization algorithm in FIG. 5 identifies that in state 222, $\upsilon_{dropdown2}$ and $\upsilon_{span}$ must be accessible via the keyboard, but since neither node is reachable from v0 in that state, both are in the set $V_{KAF}$. When identifying the edges responsible to connect these nodes, the algorithm first identifies $V_s$ as a cluster 270 reachable from $\upsilon_0$ and $V_T$ as a cluster 272 where $\upsilon_{dropdown2}$ resides. The algorithm then identifies an edge represented by a dashed line 274 as the candidate faulty edge with the highest suspiciousness score due to their proximity in the DOM. This concept also applies to $\upsilon_{span}$ in another cluster 276.

If the current PCNFG state does not match a state in the KNFG, then the identification of the missing edge is simplified (line 4 and 21-22 in FIG. 5). Because of the way the example process constructs the KNFG*, a new state in the KNFG* is only defined if there exists some action (an edge) that during the crawling of the current KNFG state transitions the state's $V_s$ to $V'_s$. Thus, if a state exists in the PCNFG* and not in the KNFG*, it indicates: (1) there exists some missing keyboard navigational transition leading to the V' state; and (2) the state transition edge to V' state in the PCNFG* is the edge most likely to be faulty. Line 22 in FIG. 5 classifies the missing state transition edge with the highest possible suspiciousness score of 0.

For example, in the point-click navigation flow graph 202 in FIG. 2B, state 226 and state 228 are explored via mouse-hovering on menu (Dropdown1) 234 and menu (Dropdown2) 236. The algorithm identifies the inter-state edge (represented by area 290) that transition from these nodes to the states 226 and 228 as suspicious edges because these states are not in the keyboard navigation flow graph 200 in FIG. 2A.

Detection of Keyboard Traps

Keyboard Traps cause KB based users to become "stuck" in a sequence of one or more nodes. The navigation flows that cause this to occur are identifiable as cycles in the KNFG. This represents a situation where once a KB user has entered the cycle with either a Tab key or a shift+tab key, they will be unable to navigate away from the elements in the cycle using the keyboard.

The approach to detect Keyboard Traps is a keyboard trap detection Algorithm shown in FIG. 6. The algorithm begins by iterating over each KNFG in the KNFG* (Line 1). For each KNFG, the approach extracts two edge-induced subgraphs, one based on edges labeled with the tab key action and the other one based on edges labeled with the Shift+Tab keys. The two subgraphs are computed by iterating through the edge set E of the KNFG and retaining the subset of edges where ϕ=Shift+Tab or the Tab key alone. These two subgraphs represent the two ways KB based users are able to navigate among elements and that would be affected by a cycle. Using the edge induced subgraphs enables the approach to avoid false-positives that would be caused by cycles defined by the forward-backward edges created for each node due to the Tab and Shift+Tab navigation and by edges whose actions may not cause a focus shift, such as the ↑, ↓, ←, →, Enter, or Space keys. The approach then iterates over the two subgraphs (Line 4). The approach first removes the specially created edges that link the last element in a page's tab order and the first element (i.e., $\upsilon_n \leftrightarrow \upsilon_0$) (Line 5). The reason for this removal is that this specially added edge creates a cycle in the KNFG to enable users to cycle from the last node in the tab order to the first, but does not represent a Keyboard Trap. After the edge removal, the process analyzes the subgraph to determine if it comprises a cycle, in which case the approach has identified that a KTF exists in the KNFG (Line 6).

In the state 224 of the keyboard navigation flow graph 200 in FIG. 2A, four cycles represented by an area 278 is detected. The first cycle occurs when the user executes the compound action $\Sigma_M$ on the node Tel #1 and [Shift+Tab] on node Tel #2 (entering the max length of a numeric string in the area code text input (node Tel #1) and then navigating backward using Shift+Tab). The self-cycle is formed on node Tel #2 as a result of the auto-tabbing feature preventing the focus from going backward. Therefore the focus loops back to itself. The second cycle is formed similarly by the auto-tabbing from node Tel #2 to node Tel #3 where the focus is always automatically advanced to node Tel #3 upon filling in Tel #2 and going backward using Shift₊ Tab. The third cycle puts the focus back to node Tel #1 when navigating forward from node Tel #3 using Tab. Conversely, the fourth cycle puts the focus back to node Tel #3 when navigating backward from node Tel #1 using Shift+Tab. The third and fourth cycles are part of a common feature that contains the keyboard focus within the three telephone number textboxes by looping around them to prevent the user from leaving these components until all three inputs have been filled in.

The two cycles of size 1 formed by edge $\langle v_{tel2}, v_{tel2}, \Sigma_M$ [Shift+Tab], $V_s \rangle$ and $\langle v_{tel3}, v_{tel3}, \Sigma_M$ [Shift+Tab], $V_s \rangle$ are results of the auto-tabbing mechanism. The larger two cycles of size 3 formed by edges $\langle v_{tel1}, v_{tel2}, \text{Tab}, V_s \rangle$, $\langle v_{tel2}, v_{tel3}, \text{Tab}, V_s \rangle$, $\langle v_{tel3}, v_{tel1}, \text{Tab}, V_s \rangle$ and $\langle v_{tel1}, v_{tel3}, \text{Shift+Tab}, V_s \rangle$, $\langle v_{tel3}, v_{tel2}, \text{Shift+Tab}, V_s \rangle$, $\langle v_{tel2}, v_{tel1}, \text{Shift+Tab}, V_s \rangle$ are the result of the mechanism that prevents the user from leaving the three telephone boxes in the telephone field 250 unless entries have been filled.

Localization of Keyboard Traps

When a keyboard trap (KTF) occurs it indicates that an edge has been created that should not be present in the navigation. The key insight is that a KTF is caused by an edge that already exists but whose transition to the next node in the navigation flow is incorrect. Therefore, the example process tries to identify which edge in the KNFG is mostly likely to be incorrect. Since there is not a definitive way of identifying this edge, a suspiciousness score based approach is employed that encodes heuristics that we found useful in identifying the likely faulty edge.

The approach for computing suspiciousness of the edges is shown in a keyboard trap localization Algorithm shown in FIG. 7. Lines 2-6 in the algorithm in FIG. 7 employ the same preparatory steps used in the detection algorithm in FIG. 6. Namely, the approach iterates over each KNFG of the page under test, identifies the two edge induced subgraphs in the KNFG, and then removes the edges between v and v0 of each subgraph. Both heuristics employed by the example process focus on the nodes and edges that are part of a cycle (i.e., the detected KTF). Therefore, the next steps of the algorithm (lines 7-9) identify and extract the connected components in the graph. The example process does this by using Tarjan's bridge-finding algorithm to find and remove all bridges (i.e., edges that disconnect a component when removed) in G (lines 7-8). This leaves only connected components in G. Since this set of components may include components of size one with no self-loops, the approach removes these nodes (line 9). These nodes can be safely removed from consideration since, by definition, they cannot be part of a trap (i.e., they do not contain a self-loop and are not part of a larger cycle).

The next part of the algorithm in FIG. 7 (lines 10-19) applies the localization heuristics of the example process. The example process employs two heuristics for localization. The first heuristic is that edges in a connected component are more likely to be a faulty edge than those not in the component. This heuristic is reasonable since typically one of the edges in the component's cycle should actually be directed to a node not in the cycle (i.e., breaking the cycle), and the failure to do so is the cause of the KTF. This heuristic is implemented in lines 11-13 of FIG. 7, which iterate over the edges in the component and increase the suspiciousness score of each of them. The second heuristic focuses on identifying the edge in the cycle that is most likely to represent the back-edge with respect to the page's navigation flow. The key insight to doing this is that the default tab navigation rendered by the browser is determined by a depth first, pre-order traversal of the DOM tree. In most cases, unless scripting was used to alter the tab sequence, the DOM rank determines the keyboard navigation flow. In lines 14-17 of FIG. 7, the example process leverages this information to identify the most suspicious edge within the cycle. Specifically, for the Tab induced subgraph, this edge is the one that flows from the lowest (min) DOM ranked element to the highest (max) DOM ranked element (line 15). For the Shift+Tab induced subgraph, since this goes in the reverse direction, it is the edge that flows from the highest (max) DOM ranked node to the lowest (min) DOM ranked node (line 17). Such a back-edge may not exist if the default sequence of tab navigation is violated. In such extremely uncommon cases, the heuristic would still work, but not as well (i.e., lower the fault's ranking). The back-edge identified by this heuristic has its suspiciousness score increased (line 19). These heuristics are applied for each KNFG and once all of them have been analyzed, the approach returns a list of all edges ranked in order of their score, highest to lowest (line 20).

In the example in FIGS. 2A-2B, the cycle formed across $v_{tel1}$, $v_{tel2}$, and $v_{tel3}$ that prevents the user from leaving the three telephone boxes consists of three edges in either the Tab and Shift+Tab direction. The order of appearance of these three text fields in the DOM sequence would make the edge $\langle v_{tel3}, v_{tel1}, \text{Tab}, V_s \rangle$ and $(v_{tel1}, v_{tel3}, \text{Shift+Tab}, V_s)$ as the respective "back-edge" that is more suspicious.

Evaluation

To assess the effectiveness of the example process, an empirical evaluation was conducted that focused on three research questions: 1) What is the accuracy of the example process in detecting KAFs in web applications; 2) If a KAF is detected, what is the quality of the localization results provided by the example process; and 3) How much time does the example process need to detect and localize KAFs.

The example process was implemented as an example Java-based prototype tool, Keyboard Accessibility Failure Detector (KAFE). The KAFE implementation employs a crawler-based exploration and is fully automated that requires no manual effort by a user. The implementation uses Selenium Web-Driver to load, render, and interact with the subject web pages to build the KNFG and PCNFG. All web pages were rendered with a fixed screen resolution of 1920×1080 pixels on Firefox version 68.0 controlled by Selenium version 3.141.5. During interaction with a subject web page, the WebDriver API was used to send key presses to the page and monitor the switch in focus. JavaScript-based code was written and executed to detect changes to the subject page and capture the page's DOM for further analysis. The KAFE and all experiments were run on a single AMD Ryzen Threadripper 2990WX 64-bit machine with 64 GB memory and Ubuntu Linux 18.04.4 LTS.

Subject Web Pages/Accessibility Tools

The evaluation was conducted on a set of real-world subject web pages gathered from (1) government and higher education web sites that are required by law to comply with WCAG, (2) frequently visited e-commerce web sites, and (3) sites from the Moz Top 500 most visited websites list. Subjects from these sources were chosen due to their obligation for accessibility by the ADA and their popularity. Manual interaction with each web page's UI was performed and the underlying functional components per keyboard accessibility testing techniques. 40 of those web pages that contained at least one KAF were used for examination by the testing. Overall, the 40 web pages examined contained 168 IAFs and 28 KTFs. For each KAF, the edge(s) were identified that would either enable access to IAFs or remove cycles causing KTFs, while at the same time remaining consistent with the page's pre-existing navigation flow. To help measure the false-positive detection rate in RQ1, 20 subjects were included that did not contain any KAFs. The dynamic UI contents in the subjects comprised of modern HTML5 and custom JavaScript widgets, such as sliders, dropdown menus, calendars, and tooltips components. A complete version of each subject web page was captured using an interactive HTTP proxy.

For the purpose of evaluating the performance of the example process, the results of the process were compared against a set of state-of-the-art tools from two sources: (1) existing web accessibility testing tools described in research literature, and (2) the Web Accessibility Evaluation Tools List provided by the W3C. From the existing web accessibility testing tools, the aria-check, tabindex-counter (the implementation of the Fona approach), and QualWeb were selected because these tools detected failures that at least partially overlapped KAFs. From the Web Accessibly Evaluation Tools list (2), the popular WAVE tool was selected because it had the most complete handling of keyboard accessibility issues of the listed tools.

Protocols

In relation to determining the accuracy of the example technique in detecting KAFs in web applications, the KAFE was run against the subject web pages and measured how accurately it could detect both types of KAFs. In this experiment, the precision and recall of the detection results from the KAFE were measured and compared against the accuracy of existing state-of-the-art approaches. For each subject web page, a detection was considered correct (i.e., a true-positive) if KAFE indicated the page contained a KAF of a type and had previously been determined that the page contained a KAF of that type. False-positives, true-negatives, and false-negatives were calculated in an analogous way.

The four state-of-the-art tools compared against the example process each had their own way of reporting detections. The results of these tools were normalized so they could be compared against the KAFE. QualWeb and WAVE target several different types of accessibility related failures, such as low color contrast and missing alternative texts, therefore they generate many issue reports unrelated to KAFs. For these two tools, reports were considered with any mention of keyboard accessibility issues as a KAF detection for the corresponding web page. The tabindex-counter tool scans and reports a ratio (0 to 1 (100%)) for a web page based on the number of interactive elements that have valid tabindex and ARIA role attributes. Any ratio less than 100% was considered to be a detection for the page. The aria-check tool uses behaviour-based acceptance tests to evaluate a page's dynamic behaviour with respect to accessibility requirements through 23 pre-defined usage scenario test cases. The failure of any of these tests was considered to constitute a detection. For all four tools, the example mechanism for recognizing a detection was consistent with the tool's intended usage and resulted in the most favorable accuracy scores for the tool. The result of accuracy is shown in a table 800 in FIG. 8. The columns 'DEP' and 'DER' in the table 800 show each tool's detection precision and recall for each type of KAFs.

In relation to the ability of the KAFE to accurately identify the faulty element(s) responsible for the KAF, the KAFE was compared against only the QualWeb and WAVE tools since the tabindex-counter and aria-check tools do not provide localization information. To measure localization quality, the effort metric frequently used in the fault localization communities was used by calculating the expected number of elements a developer, using the output of each tool, would have to examine to find the fault. This metric reflects an assumption about developers' behavior and provides a normalization that allows quantification and relatively comparison of results.

To calculate localization quality of the KAFE for subjects containing only a single KAF, the rank of the faulty edge in the ranked list of edges produced as the output of the localization algorithms was used. For subjects containing multiple failures, the rank of each faulty edge was calculated using a methodology reporting the rank of the first faulty element that appears in the result set, simulates the fix of that fault, and then reruns the localization analysis to get the ranking of the next highest fault. The intuition behind using this methodology is that it approximates the workflow of a developer who scans the results, fixes a fault, and then reruns the analysis to see if any more faults remain.

To calculate the localization quality of the results generated by the QualWeb and WAVE tool, a slightly different process was employed since neither tool ranks the reported HTML elements. Therefore, a methodology approximating average rank was used under the assumption that the faulty element is uniformly distributed in an unordered set. For a single fault, the average rank is, on average, half the size of the unordered set. In the case of multiple faults, this generalizes to a linear search fork number of items (faults) in an unordered set of size n where the distribution of the k items is uniformly random. The equation for calculating this values is (n+1)/(k+1). Lastly, since both tools return a set of HTML elements, as opposed to edges, a localization was considered successful if the tool identified a node corresponding to either the source or target of the faulty edge. In the table 800 in FIG. 8, the column '#LOR' shows the localization recall of each tool, which is the percentage of output sets returned that contained the faulty element in any rank. The columns '#MEF' and '#AEF' show the median and average number of elements needed to be examined to find the KAFs for each tool.

The running time of the four known tools and the example KAFE on each subject web page was measured to determine the time the example process needs to detect and localize KAFs. For the example KAFE, the running time includes the time to start the tool, load the browser, build the models, and compute detection and localization results using the algorithms in FIGS. 4-7. For the other four tools, the running time included the time to run the tool on a subject until the output of the tool was displayed. For the QualWeb tool, this meant the time to submit a subject link for analysis until the result page was displayed. For the WAVE too, the running time included the time from the browser extension was clicked until the results were displayed. For the tabindex-counter and aria-check tools, the running time included the time of loading the page, executing the tool's unit test codes, and displaying the result. The results of running time evaluation are shown in the table 800 in FIG. 8. For each tool, the 'Average' column shows the average running time.

For detecting IAFs, the results in the table 800 in FIG. 8 shows that the example KAFE was able to detect IAFs in the subject applications with high accuracy. In terms of precision, the tabindex-counter tool performed better; however its recall was only 39%. From examining this result, use of the tabindex tool to detect IAFs was a very precise approach but did not detect all of the different ways KAFs could occur. In terms of recall, only the aria-check tool matched the recall of the example KAFE for IAFs. In relation to the aria-check tool, 42 subjects failed all of its 23 test cases and all of the subjects failed at least one of the test cases. This included subjects that we had verified as free of IAFs. This result indicates that failures to conform to ARIA markup structure are not sufficient to indicate the presence of IAFs. Lastly, none of the approaches, except for KAFE, were able to detect any of the KTFs. The keyboard traps were undetectable by the other tools because they focused on examining DOM based properties, but KTFs represent runtime behavior that is undetectable by examining the DOM.

In terms of the quality of the localization, KAFE performed significantly better than the other two approaches. One of the key results that show this is the localization recall (LOR). For IAFs, this metric shows that the HTML elements outputted by QualWeb contained only 6% of the faults and WAVE contained only 15% of the faults. In contrast, KAFE's output contained 94% of the faults. Significantly, the results of median rank (MEF) and average rank (AEF) show that KAFE was able to consistently highly rank the faults. In fact, across all subjects, KAFE ranked the faulty edge in the top three for 35% of the faults, and in top ten for 76% of the faults. For KTFs, the localization quality was also high, but it was not possible to compare against other approaches since none of them could detect (and therefore localize) KTFs.

The runtime of KAFE was slower than the other approaches. However, in absolute terms the average amount of time needed by KAFE, about twenty minutes, is not a significant amount of time. Furthermore, this higher time cost is offset by its much higher precision and recall than the other approaches. The runtime breakdown of each individual step in the example KAFE shows that over 99% of the total time was spent on modeling and building the graphs. The time spent crawling the KNFG* and PCNFG* was evenly split between an average of 9.9 minutes and 9.2 minutes respectively. The average times for detection and localization were 0.8 seconds and 3 seconds respectively. There was no noticeable difference between detecting and localizing IAFs (1.1 seconds) versus KTFs (2.7 seconds).

Figure 9A:
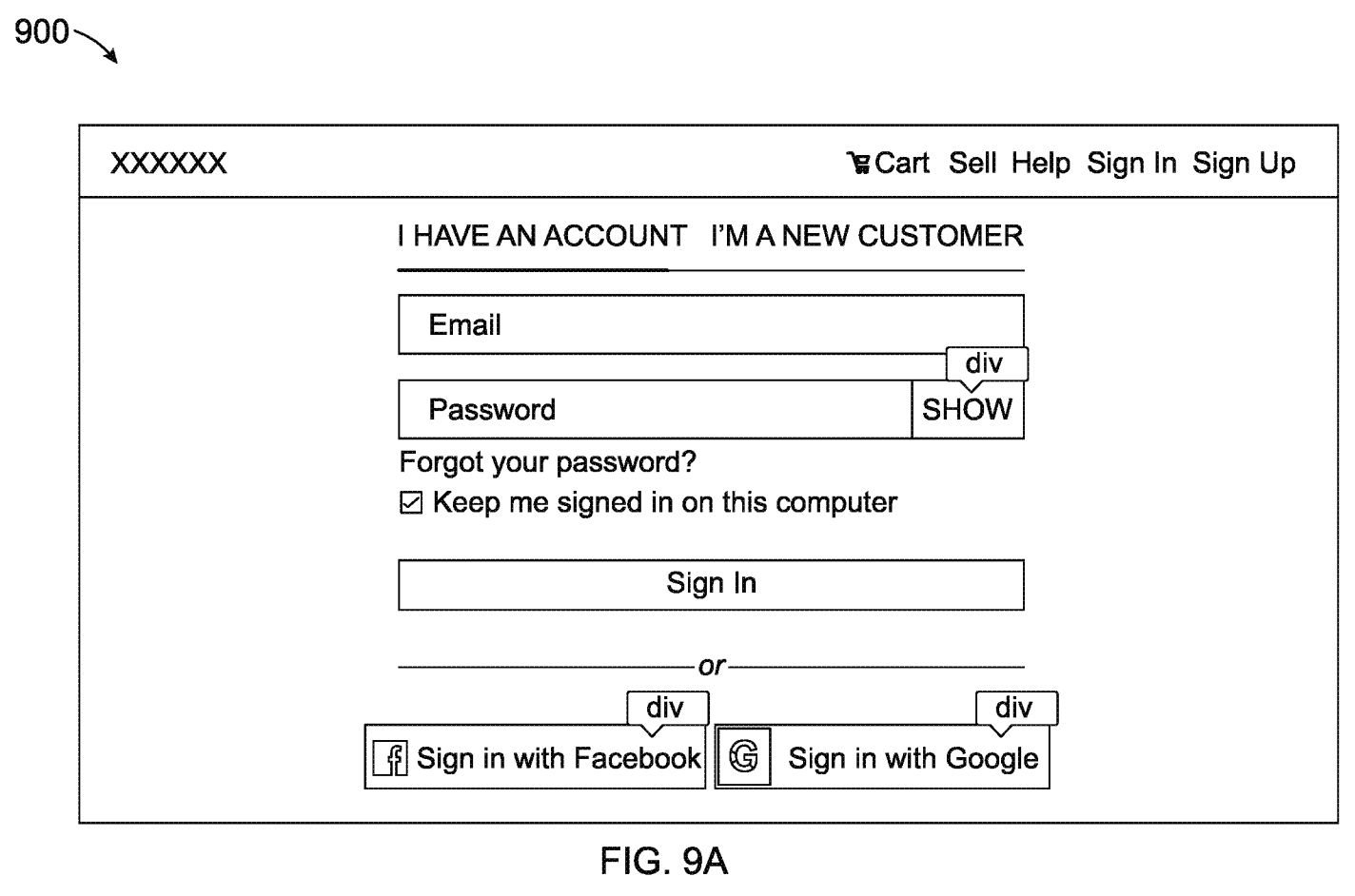
Figure 9B:
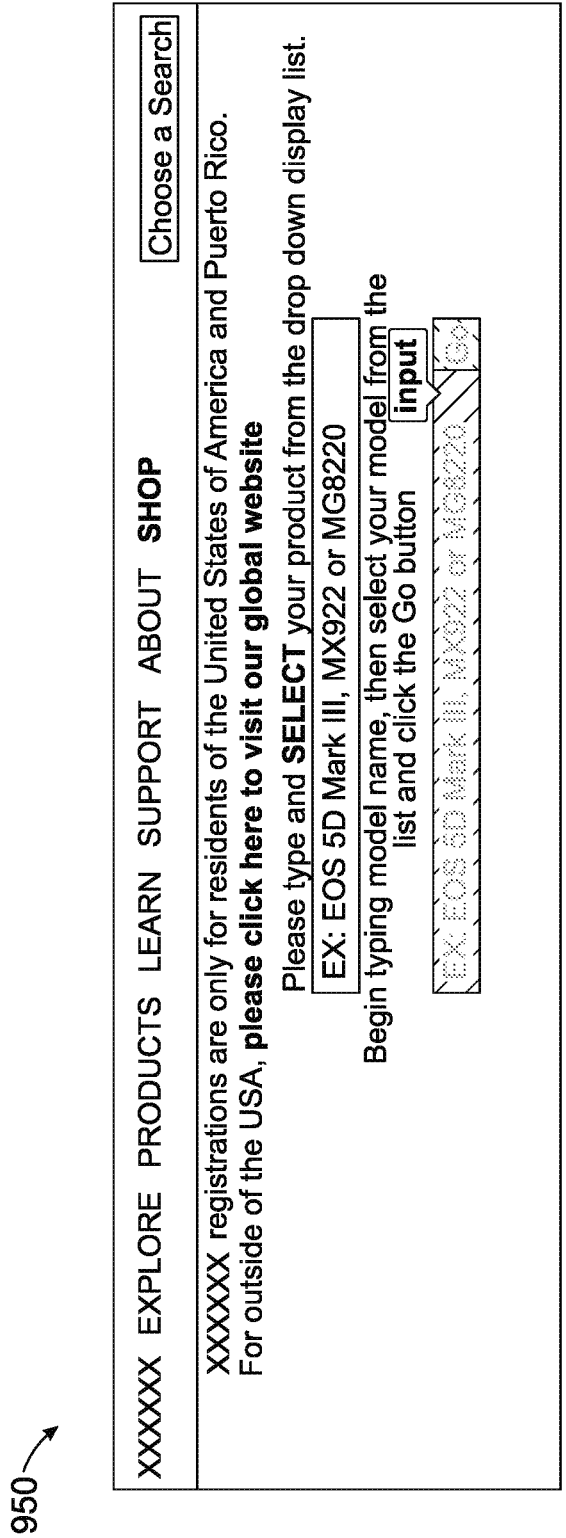
FIG. 9B shows another example of another keyboard accessibility failure on web page, according to one or more embodiments of the present disclosure.

The impact of the KAFs found in the subject websites was generally quite severe. For IAFs, often core functionalities of the web page were unavailable to keyboard-based users. For example, they would be unable to log in via Google or Facebook's external authentication, unable to retrieve their password, unable to change their language/locality preference, or sometimes unable to use the "Like" Facebook plugin. FIG. 9A shows an example log in a web page 900 that shows an example KAF where the show password button is not focusable and the "Facebook" and "Google" log-in buttons are focusable but not actionable by the keyboard. The impact for KTFs was even more dramatic than IAFs. Users would get stuck when entering data into web forms with auto-tabbing scripts, preventing them from moving backwards to make corrections. This is particularly troublesome for blind users that must move backwards through the fields to verify that they correctly entered the numbers via screen readers. When stuck, they would be forced to refresh the page, or close the browser and risk losing all of the form information entered.

The subject web pages were analyzed to identify root causes of IAFs and several reoccurring patterns were found. (1) Custom UI controls based on <div>, <span>, or <li> where developers would implement mouse event handlers but not keyboard handlers. For example, 37 out of 455 buttons and 22 out of 58 dropdown-lists across our subject pool were inaccessible due to their inability to receive keyboard focus. 34 instances were found where an <a> was used to trigger JavaScript instead of having an "href" attribute. As a result, these elements were not able to receive keyboard focus. There were two instances where the developer explicitly assigned a tabindex of 0 to make a custom widget focusable but yet, without defining any keyboard event handlers, the controls were not actionable. (2) Actions triggered by mouse hovering. Overall, a remarkably high 35 of 49 menus implemented to expand when a mouse hovered over them were inaccessible. Roughly a third of those could not receive focus, and most of the others that could receive focus could not expand via a keyboard action. This problem also appeared when tooltips were implemented using custom mechanisms. (3) Overridden standard control elements. Three were six cases of checkbox/radio-button whose operations were delegated to a programmatically associated <label>. Clicking on the <label> indirectly activated the control. However, for aesthetics, the developers made these control hidden and styled its <label>'s CSS to make it appear to be a custom checkbox/radio-button. These inaccessible implementations assume that users would be able to "click" on the <label> to tick the associated control.

For root causes of KTFs, several reoccurring patterns were found. (1) Auto-advance during data entry in web forms. Over half of the of the KTFs found were due to mistakes in implementing this functionality. (2) Customized widgets bound to scripts that altered the focus or the layout of the UI. Often unintended side effects of this alteration would lead to the KTF. (3) Text input boxes with overridden keydown and keypress events. Typically, these would be used to auto-complete data entered into search boxes or to filter the contents of dropdown lists as users entered text. An example of this may be seen in a registration web page 950 shown in FIG. 9B where the keyboard focus is trapped on the input box. Mistakes in the implementation of these handlers resulted in keyboard users being unable to navigate away from the input box.

In some examples, a Selenium WebDriver may be unable to interact with some elements that it considers "NotInteractable" or when the DOM is considered "Stale." For example, when elements are obstructed by others or when the DOM is spontaneously altered caused by AJAX calls that were not triggered via our automated interaction (e.g., events automatically loaded via a timer, a slider/-carousel that constantly loads persistent streams, or asynchronous calls that implement infinite scrolling to load and populate data). In order to adjust this behavior, further web page capture and replay techniques may be updated).

In some examples, for different web browsers the KAF ground-truth may vary. These browser-specific KAFs could be easily detected by systematically running KAFE using different Selenium WebDrivers for different browsers.

The success criteria in WCAG are, by design, defined in such a way as to make it possible to objectively determine when a failure has occurred. Thus, any potential criterion validity threats may be mitigated. Further, the failures are also defined in terms of behaviors of specific elements of a UI, which makes it possible to objectively determine the faulty element that should be identified by KAFE.

Poorly designed web applications create keyboard accessibility barriers that exclude people with disabilities from interacting with its functionalities. The example process automatically detects and localizes KAFs in web pages. The example process detects and localizes keyboard failures with high precision and recall. The example process results in outputs that may assist developers to debug KAFs in web applications.

Figure 10:
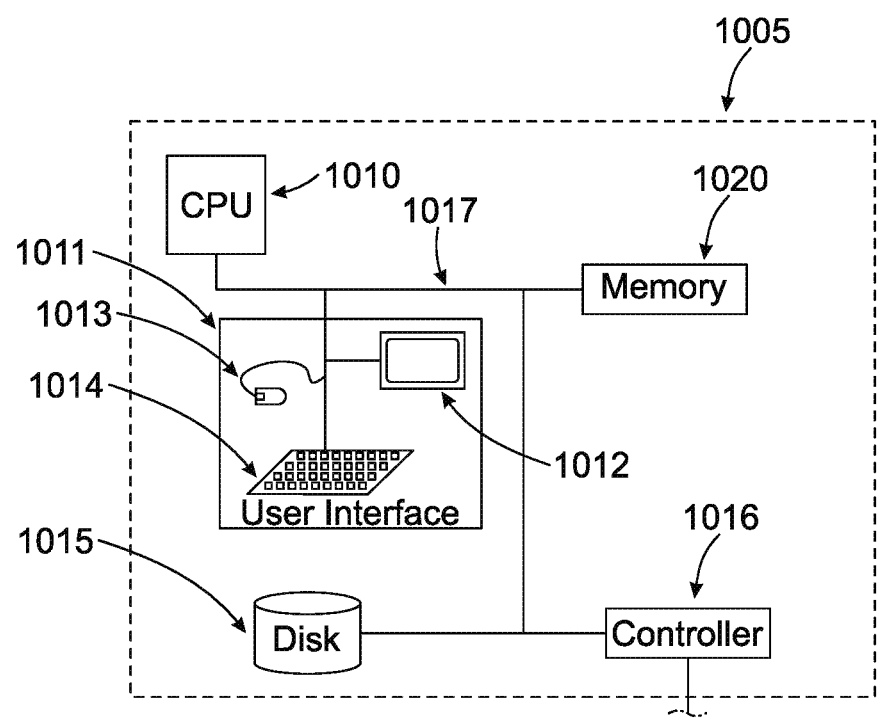
FIG. 10 shows a block diagram of an example computing system for implementing the various embodiments; according to one or more embodiments of the present disclosure.

FIG. 10 illustrates an exemplary system for implementing the various embodiments. In particular, FIG. 10 illustrates a computing system including a computing system 1005. The exemplary computing system 1005 includes a digital processor (CPU) 1010 that may be used to perform classical digital processing tasks.

Computing system 1005 may include at least one digital processor (such as central processor unit 1010 with one or more cores), at least one system memory 1020, and at least one system bus 1017 that couples various system components, including system memory 1020 to central processor unit 1010.

The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc., and/or combinations of the same.

Computing system 1005 may include a user input/output subsystem 1011. In some implementations, the user input/output subsystem includes one or more user input/output components such as a display 1012, mouse 1013, and/or keyboard 1014.

System bus 1017 can employ any known bus structures or architectures, including a memory bus with a memory controller, a peripheral bus, and a local bus. System memory 1020 may include non-volatile memory, such as read-only memory ("ROM"), static random access memory ("SRAM"), Flash NAND; and volatile memory such as random access memory ("RAM") (not shown).

Computing system 1005 may also include other non-transitory computer- or processor-readable storage media or non-volatile memory 1015. Non-volatile memory 1015 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 1015 may communicate with digital processor via system bus 1017 and may include appropriate interfaces or controllers 1016 coupled to system bus 1017. Non-volatile memory 1015 may serve as long-term storage for processor- or computer-readable instructions, data structures, or other data (sometimes called program modules) for digital computing system 1005.

Although computing system 1005 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 1020. For example, system memory 1020 may store instruction for communicating with remote clients and scheduling use of resources including resources on the computing system 1005. Also for example, system memory 1020 may store at least one of processor executable instructions or data that, when executed by at least one processor, causes the at least one processor to execute the various algorithms described elsewhere herein, including machine learning related algorithms.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a "control system" on data stored on one or more computer-readable storage devices or received from other sources.

The term "control system" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The invention claimed is:

1. A method for detecting and/or localizing keyboard accessibility failures (KAFs), the method comprising:
rendering a web page in a browser on a display portion of a computing system;
generating, via a processor of the computing system, a first graphical model based on a first type of interaction of a user with the web page;
generating, via the processor, a second graphical model based on a second type of interaction of the user with the web page; and
detecting one or more KAFs based on a comparison of the first graphical model with the second graphical model.

2. The method of claim 1, wherein the first graphical model is based on keyboard-based navigation and the second graphical model is based on mouse-based navigation.

3. The method of claim 2, wherein the first graphical model includes a set of keyboard navigation flow graphs (KNFGs) and the second graphical model includes a set of point-click navigation flow graphs (PCNFGs).

4. The method of claim 3, wherein detecting the one or more KAFs based on the comparison of the first graphical model with the second graphical model includes detecting one or more of inaccessible functionalities and keyboard traps.

5. The method of claim 1, further comprising localizing the detected one or more KAFs.

6. The method of claim 2, wherein each KNFG includes one or more of a set of all nodes in the KNFG, a state of the web page, an entry node of the KNFG, and a set of keyboard based actions that cause a focus transition between nodes in the KNFG, and a set of edges representing a set of the transitions in the web page.

7. The method of claim 6, wherein the set of all nodes includes a node for each HTML element in the web page.

8. The method of claim 6, wherein the state of the web page includes a set of HTML elements visible in the web page.

9. The method of claim 6, the edges in the KNFG are identified by iteratively exploring the page using only keyboard based actions.

10. The method of claim 4, wherein inaccessible functionalities are based on one or more missing edges from the KNFG and/or a missing key board handler for an element.

11. The method of claim 10, further comprising localizing inaccessible functionalities.

12. The method of claim 11, wherein localizing inaccessible functionalities includes finding the one or more missing edges, which includes for each missing edge, identifying the most likely source node of the missing edge and the second part tries to identify the most likely target node of the missing edge.

13. The method of claim 12, wherein finding the one or more missing edges includes analyzing the KNFG and its corresponding PCFNG, and generating a suspiciousness score for a plurality of edges.

14. The method of claim 4, further comprising localizing one or more keyboard traps.

15. The method of claim 2, wherein each PCNFG includes a set of all nodes in the PCNFG, a state based on the set of nodes that are visible in the web page, an initial node, a set of mouse event types, and a set of edges that represent the mouse navigation control flow.

16. A system for detecting and/or localizing a keyboard accessibility failure comprising:
 a control system comprising one or more processors and at least one non-transitory memory;
 a keyboard;
 a mouse; and
 a display;
 wherein the control system is configured to execute the machine executable code stored in non-transitory memory to cause the control system to:
  render a web page; generate a first keyboard based model based on navigation of the web page using the keyboard;
  generate a second point-click based model based on navigation of the web page using the mouse; and
  detecting a keyboard accessibility failure based on the first keyboard based model and the second point-click based model.

17. The system of claim 16, wherein the control system is further configured to execute machine executable code to cause the control system to localize the detected keyboard accessibility failure.

18. The system of claim 16, wherein the keyboard based model includes one or more of a set of all nodes, each representing an HTML element, a state of the web page, an entry node, and a set of keyboard based actions that cause a focus transition between nodes, and a set of edges representing a set of the transitions in the web page.

19. The system of claim 16, wherein the point-click based model includes a set of all nodes, each representing an HTML element, a state based on the set of nodes that are visible in the web page, an initial node, a set of mouse event types, and a set of edges that represent the mouse navigation control flow.

20. A non-transitory machine readable medium having stored thereon instructions for performing a method comprising machine executable code which when executed by at least one machine, causes the machine to:
 render a web page;
 model a keyboard based navigation of the web page based on user input from a keyboard;
 model a mouse based navigation of the web page based on user input from a mouse; and
 detect one or more KAFs based on the modelled keyboard based navigation and the modelled mouse based navigation.

* * * * *